W. WEIS.

FEEDER FOR THRESHING MACHINES.

APPLICATION FILED DEC. 27, 1910.

Reissued May 16, 1911.

13,242.

3 SHEETS—SHEET 1.

Witnesses:
Theo. Lagaard.
H. A. Boroman.

Inventor:
William Weis.
By F. A. Whiteley
his Attorney.

THE NORRIS PETERS CO., WASHINGTON, D. C.

W. WEIS.

FEEDER FOR THRESHING MACHINES.

APPLICATION FILED DEC. 27, 1910.

Reissued May 16, 1911.

13,242.

3 SHEETS—SHEET 2.

Witnesses:
Theo. Lagaard
H. A. Bowman

Inventor:
William Weis.
By F. A. Whiteley
his Attorney.

THE NORRIS PETERS CO., WASHINGTON, D. C.

W. WEIS.

FEEDER FOR THRESHING MACHINES.

APPLICATION FILED DEC. 27, 1910.

Reissued May 16, 1911.

13,242.

3 SHEETS—SHEET 3.

Witnesses:
Thos. Lagaard.
H. A. Bowman.

Inventor:
William Weis.
By F. A. Whiteley
his Attorney.

THE NORRIS PETERS CO., WASHINGTON, D. C.

UNITED STATES PATENT OFFICE.

WILLIAM WEIS, OF PERHAM, MINNESOTA.

FEEDER FOR THRESHING-MACHINES.

13,242. Specification of Reissued Letters Patent. Reissued May 16, 1911.

Original No. 934,490, dated September 21, 1909, Serial No. 493,466. Application for reissue filed December 27, 1910. Serial No. 599,610.

*To all whom it may concern:*

Be it known that I, WILLIAM WEIS, a citizen of the United States, residing at Perham, in the county of Ottertail and State of Minnesota, have invented certain new and useful Improvements in Feeders for Threshing-Machines, of which the following is a specification.

My invention relates to feeding devices for threshing machines, whereby the bundles may be conveyed from both sides of the machine to a horizontal carrier at the top thereof, said carrier moving in a direction from the rear to deliver the bundles into a rearward opening of a feed box, otherwise wholly inclosing the front of the machine.

A principal object of my invention is to provide the feed box with a curved front wall and a band cutting and feeding cylinder so related to one another and to the horizontal conveyer as to spread and feed the grain downwardly along said curved front wall to the threshing cylinder.

A further object of my invention is to provide such a feed box having at the bottom thereof the usual threshing cylinder and concave, and above said threshing cylinder and immediately beneath the rearward opening of the feed box being provided with rotary means for receiving upon the upper surface of said rotary means bundles directly from the horizontal carrier, cutting the bands thereof and feeding the straw against the curved wall of the feed box and downward therealong, thereby properly spreading and feeding in a comparatively thin sheet the straw to the cylinder and concave.

Figure 1:
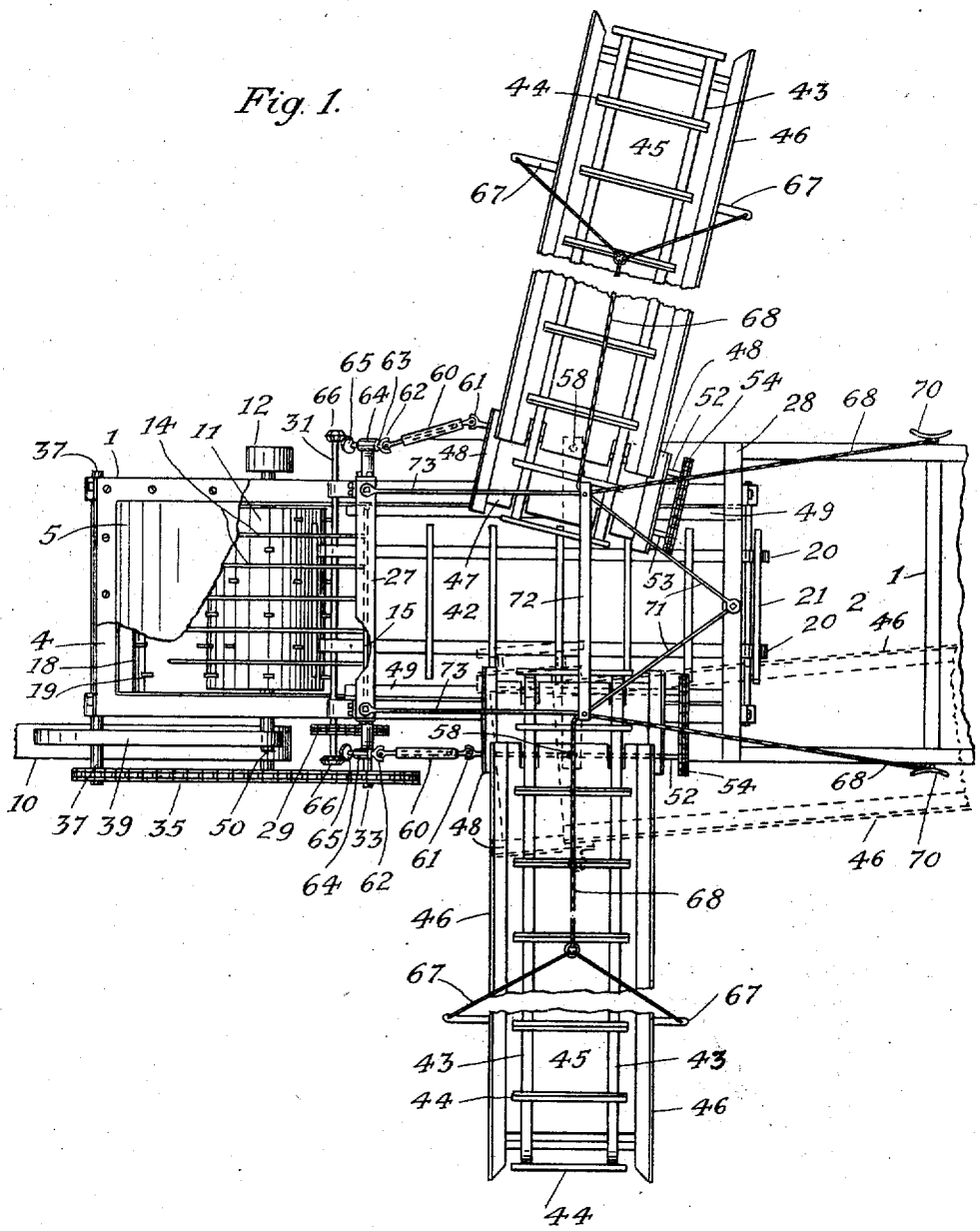
Figure 2:
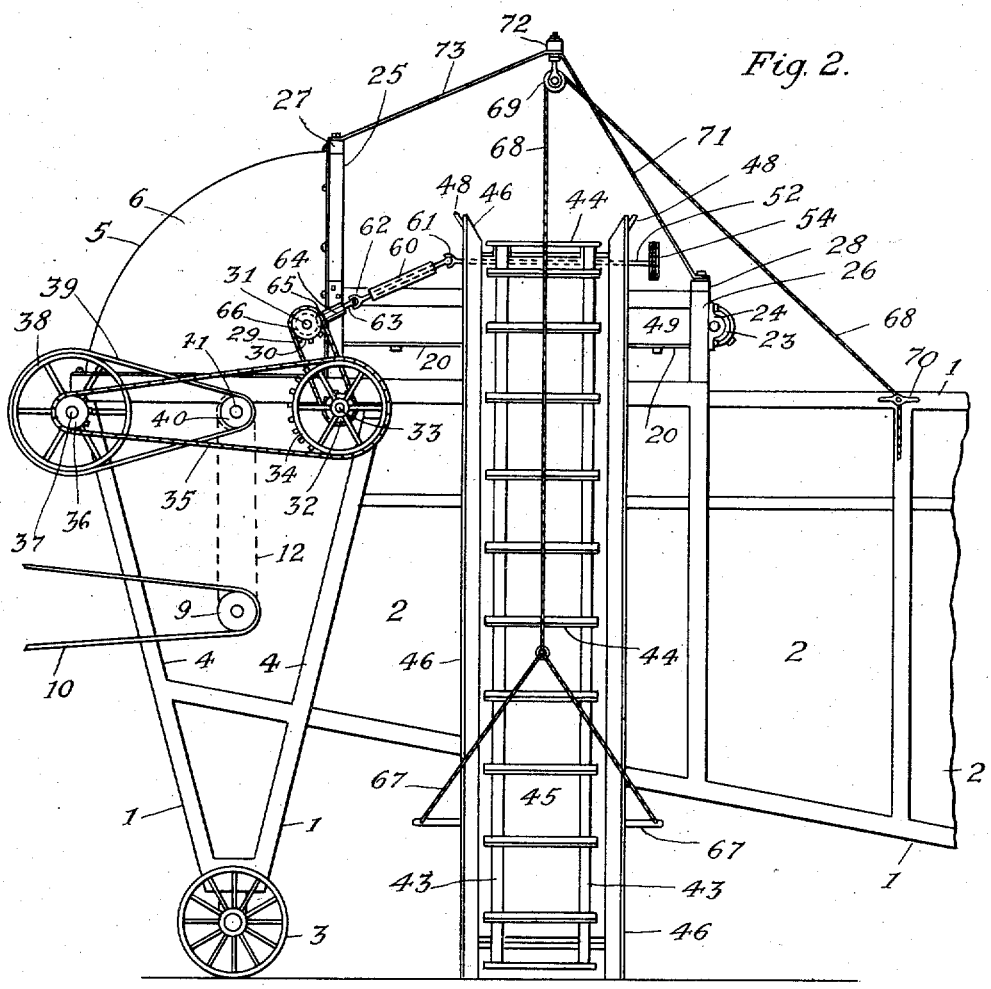
Figure 3:
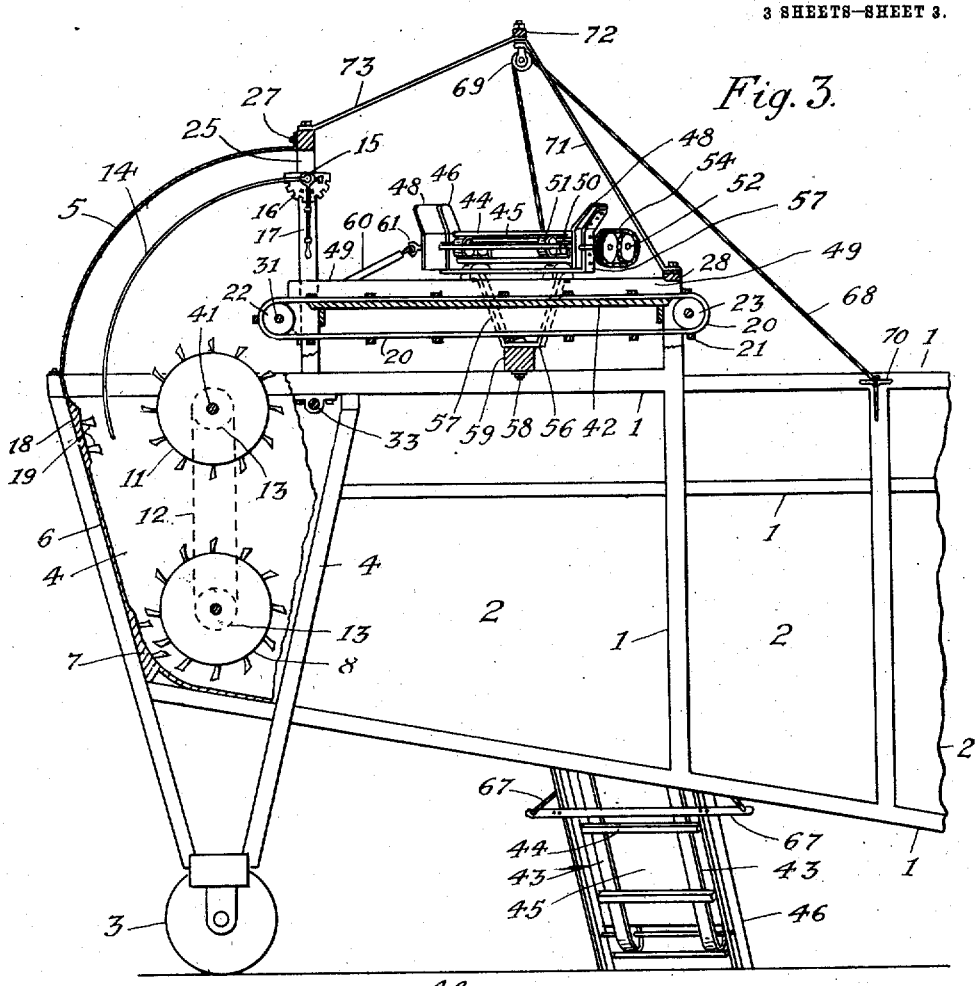
Figure 4:
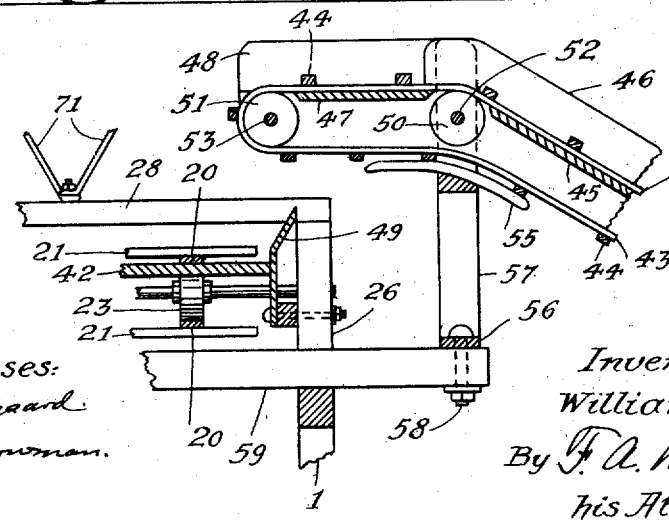

In the drawings, which illustrate one form of my invention,—Figure 1 is a plan view of the forward portion of a threshing machine embodying my improvements. Fig. 2 is a side elevation of the same. Fig. 3 is a central vertical section of the same portion of the machine. And Fig. 4 is an enlarged transverse sectional view showing portions of the bundle-carrier and feeding devices.

The feed box and related parts of the feeder may be built directly upon the framework 1 of the machine, as shown, or it may be separately constructed and arranged for attachment thereto, as desired, said feeder being otherwise entirely independent of all other parts of the threshing machine, excepting only for the driving belt 12 from the main shaft to the band cutting and feeding cylinder 11 by which the moving parts of the feeder are driven. The end walls 4 of the feed box will, in either event, form a practical continuation of the main casing 2 of the threshing machine. The front wall 6 of the feed box extends in a curved form from below the threshing cylinder 8 and concave 7 upwardly and forwardly of the machine to a point 4′ substantially in horizontal line with the top platform of the machine, from which point it curves rearwardly, forming a sort of hood 5. The end walls 4 and front wall 5, 6 of the feed box are connected together and to the casing of the machine so as completely to inclose the front end of the threshing machine, said feed box opening only directly to the rear above the top platform of the threshing machine, as indicated at $x$. This arrangement of the feed box, and especially of the curved front wall thereof, is one of the essential features of my invention. The grain being fed into the feed box in a horizontal direction from the rear is driven against said curved front wall of the feed box by the band cutting and feeding cylinder 11, and the coöperation of said cylinder and rear wall upon the grain so fed has the effect of spreading and retarding the movement of the grain so that it flows downward to the threshing cylinder 8 in a comparatively thin sheet which provides the most satisfactory threshing feed.

The threshing cylinder 8 is driven, as usual, by means of a pulley 9 and belt 10.

The band-cutting and feeding cylinder 11 is positioned above the threshing cylinder 8, and may be somewhat in front thereof, and is rotated in the same direction by a belt 12 connecting pulleys 13 on the shafts of the cylinder and band-cutter. As to the form of the band-cutter I prefer to use a toothed cylinder similar in construction to the threshing cylinder 8, but, of course, do not wish to limit myself to that precise form. A device of the kind suggested serves not merely to cut the bands, but acts as an efficient feeder of the material to the cylinder.

For holding the sheaves to proper contact with the cutter 11 when delivered to the feed-box I employ a series of spring arms 14 carried by a transverse bar 15 above the cutter and extending in forward direction and curved downward in front of the cutter.

The bar 15 can be turned on its axis to vary the distance of the free ends of the arms from the cutter, and a fixed notched plate 16 that is engaged by a dog 17 enables the bar to be locked in adjusted positions. To retard the descent of the sheaves, in order that they may be properly operated upon by the cutter 11, a plate 18 provided with teeth 19 may, if desired, be secured to the inner side of the front of the box 4 about on the horizontal plane of the cutter.

The sheaves are conveyed and delivered to the feed-box by a horizontal endless conveyer composed of belts 20 and transverse slats 21 and arranged above the deck of the machine. The rollers 22 and 23 for the conveyer are journaled in boxes 24 on posts 25 and 26 mounted on the main frame; and the posts of each pair are connected by cross-pieces 27 and 28. This conveyer is driven by means of a chain 29 connecting a sprocket-wheel 30 on the axis 31 of its forward roller with a sprocket-wheel 32 on a transverse shaft 33; and the latter shaft is driven by a sprocket-wheel 34 connected by a chain 35 with a sprocket-wheel 36 on a shaft 37 mounted at the front of the frame and driven by a pulley 38 connected by a belt 39 with a pulley 40 on the axis 41 of the band-cutter. A shelf or support 42 is provided for the working portion of the conveyer to prevent sagging.

The sheaves may be delivered to the conveyer from both sides of the machine by endless carriers. For convenience and speed of operation it is found desirable in practice to employ duplicate carriers arranged at opposite sides of the machine, as shown in Fig. 1. These carriers are so constructed and arranged as to be adjustable independently of each other in both vertical and horizontal directions by turning them on their pivotal connections adjacent to the sides of the conveyer. A carrier may, of course, be operated to convey bundles from one side of the machine only, but in the practical operation of my feeder the best results are obtained from depositing bundles simultaneously on both sides of the horizontal conveyer. The bundles are then carried from the rear along the top of the machine and presented to the band-cutting and feeding cylinder 11 throughout its length, so that the sheet of straw, spread and fed downwardly to the threshing cylinder by the combined action of the feeding and band cutting cylinder and the curved front wall of the feed box, will be of uniform density throughout its width, a condition which will then continue as the straw passes rearwardly through the various threshing instrumentalities of the machine.

The carrier may be of ordinary construction and may consist of a pair of endless straps or belts 43 connected by cross-slats 44, and the working portions of the belts are supported on the bottom 45 of a trough, the sides 46 of which have their upper portions flaring. The upper end of this main trough is arranged within the outer end of a short horizontal trough, composed of a bottom 47 and sides 48, which is placed in position to discharge the sheaves onto the conveyer. Guide strips 49 are provided to prevent the sheaves from falling off the sides of the conveyer. The belts 43 are driven by rollers 50 and 51 the shafts 52 and 53 of which carry sprocket-wheels that are operatively connected by a chain 54. The belts 43 are supported beneath the roller 50 by a curved guide 55 to prevent undue sagging.

The shaft 52 is journaled on the upright arms of a pivoted frame composed of a horizontal bar 56 to which are attached the uprights 57, and the bar or base is pivotally connected by a bolt 58 to a cross-piece 59 that is secured above the deck of the machine. The sides 48 of the horizontal trough are secured to the uprights 57, so that that trough will turn with the pivoted frame, and the axis 53 for the roller 51 is journaled in the trough sides 48. By this arrangement both sections of the carrier are made to turn in unison in lateral direction.

The carrier shaft 52 is driven by means of a telescoping shaft 60, to one member of which it is connected by a universal joint 61, the other member being connected by a similar joint 62 to a short shaft 63 journaled in a box 64 on a bracket on the post 25 and provided with a bevel pinion 65 in mesh with a bevel gear 66 on the shaft 31. The telescoping shaft and the universal joints connecting it with the driving connections permit the carrier to be turned and adjusted in vertical and horizontal directions, as will be obvious. For readily accomplishing such movements and adjustments of the carrier the following means are provided. To a sling 67 connected to the carrier near its outer end is attached a cable 68 which runs over a pulley 69, supported at a proper height above the machine, and extends thence rearward and downward. By operating the cable the carrier can be raised or lowered as desired, and can be secured to a cleat 70; and the carrier can be swung by hand laterally on its pivot 58 to whatever extent is desired.

When not in service the carrier can be raised by means of the cable to approximately horizontal position above the deck and swung around toward the rear of the machine and supported thereon, as shown by broken lines in Fig. 1. To permit such movement the rear supports 71 for the pulley 69 are attached to the cross-piece 28 at its middle and extend in angular directions upward and forward to the cross-bar 72 from which the pulley is hung; and the forward supports 73 extend from the tops of the posts 25 in upwardly inclined direction to the ends of the bar 72.

It will thus be seen that the main elements of my improved feeder consist of carriers, preferably at both sides of the machine, a conveyer moving horizontally from the rear toward the front of the machine, a feed box entirely inclosing the front of the machine and opening only to the rear thereof, a toothed cylinder placed just beneath such rearward opening, and coöperating with said horizontal conveyer on one side and the curved front wall of the feed box on the other not only to cut the bands of the bundles, but to spread and feed the straw downward along said front wall to the threshing cylinder.

In operation the sheaves or bundles are laid upon the lateral carriers, preferably at both sides of the machine simultaneously, and with their heads toward the front of the machine. The bundles are thus conducted and delivered to both sides of the horizontal conveyer, and by it carried from toward the rear of the machine into the opening *x* of the feed box, where the cylinder 11 not only cuts the bands, being assisted thereto by the yielding arms 14, but also feeds the grain forward against the curved front wall of the feed box, which, aided by the additional retarding member 18, when such a device is used, spreads and distributes the straw, the entire operation feeding said straw gradually downward between the cylinder 11 and the front wall of the feed box to the threshing cylinder.

I claim:

1. In combination with the threshing cylinder of a threshing machine, a feeder comprising a feed box at the front of the machine having a closed front wall opening toward the rear of said machine, said wall consisting of a lower concave portion with which the threshing cylinder coöperates, an intermediate upwardly and forwardly extending portion and an upwardly and rearwardly extending portion above and continuous with the latter, and means adapted to feed material toward said wall having an operative portion thereof within said upwardly and rearwardly extended portion of the front wall and spaced therefrom to provide a passage between said feeding means and said wall, and means for moving the feeding means and threshing cylinder in the same direction.

2. In combination with the threshing cylinder of a threshing machine, a feeder comprising a feed box at the front of the machine having a closed front wall opening toward the rear of said machine, said wall consisting of a lower concave portion with which the threshing cylinder coöperates, an intermediate upwardly and forwardly extending portion and an upwardly and rearwardly extending portion above and continuous with the latter, a feeding and band-cutting cylinder within said upwardly and rearwardly extended portion of the front wall and spaced therefrom to provide a passage between said feeding and band-cutting cylinder and said wall, and means for moving the feeding and band-cutting cylinder and threshing cylinder in the same direction.

3. In combination with the cylinder and concave of a threshing machine, a feeder comprising a feed box at the front of the machine having a front wall continuous with said concave and extending upwardly and forwardly and then rearwardly and opening only toward the rear of the machine, a feeding and band-cutting cylinder mounted in the feed box above the threshing cylinder and in coöperative relation with said front wall, said cylinders being geared to rotate in the same direction, and means for feeding bundles horizontally into said rearward opening upon the top of said feeding and band-cutting cylinder from toward the rear of the machine.

4. In combination with the cylinder and concave of a threshing machine, a feeder comprising a feed box at the front of the machine having a front wall continuous with said concave and extending upwardly and forwardly and then rearwardly and opening only toward the rear of the machine, a toothed cylinder mounted in the feed box above the threshing cylinder and in coöperative relation with said front wall, and a horizontal conveyer extending into said rearward opening to a point above said toothed cylinder and a little to the rear thereof, whereby bundles are fed onto said toothed cylinder and the same is caused to operate both to cut the bands and to cooperate with said front wall in spreading and feeding the grain to the threshing cylinder.

5. In a threshing machine, the combination with the feed-box and the cylinder and concave therein, of a band cutter located above and rotating in the same direction as the cylinder and adapted to throw the material toward the front of the feed box, retarding devices located in front of the cutter and comprising an unyielding toothed body in front of the cutter and intermediate resilient arms for feeding the material to the cylinder, and a conveyer located in rear of the feed box for delivering the bundles thereto.

6. In a threshing machine, the combination with the feed box and the threshing cylinder and concave therein, of a band cutter located above the cylinder and rotating in the same direction as the cylinder, retarding devices coöperating therewith comprising an unyielding toothed body in front of the cutters and intermediate resilient arms for feeding the material to the cylinder, and a conveyer located in rear of the feed box for delivering the bundles thereto.

7. In a threshing machine, the combination with the feed box and the cylinder and concave therein, of a band cutter located above and rotating in the same direction as the cylinder and adapted to throw the material toward the front of the feed box, retarding devices located in front of the cutter and comprising an unyielding toothed body in front of the cutter and intermediate resilient arms for feeding the material to the cylinder, a conveyer located in rear of the feed box for delivering the bundles thereto, a carrier for conducting bundles to said conveyer, and driving connections adapting the carrier to be adjusted in horizontal and vertical directions.

8. In a threshing machine, the combination with the feed box and the threshing cylinder and concave therein, of a band cutter located above the cylinder and rotating in the same direction as the cylinder, retarding devices coöperating therewith comprising an unyielding toothed body in front of the cutter and intermediate resilient arms for feeding the material to the cylinder, a conveyer located in rear of the feed box for delivering the bundles thereto, and a carrier for conducting the bundles to such conveyer and consisting of a laterally movable horizontal inner section overhanging said conveyer and a vertically movable outer section connected to the inner section, whereby both carrier sections are adjustable in lateral direction and the outer section is also independently adjustable in vertical direction.

WILLIAM WEIS.

Witnesses:
A. SHANNON,
C. W. EHRLICH.

Copies of this patent may be obtained for five cents each, by addressing the "Commissioner of Patents, Washington, D. C."